United States Patent [19]

Frank et al.

[11] Patent Number: 5,403,073
[45] Date of Patent: Apr. 4, 1995

[54] METHOD AND APPARATUS FOR THE BRAKING OF A VEHICLE TRAIN

[75] Inventors: Dieter Frank; Hartmut Schappler, both of Hanover; Axel Stender, Hameln; Norbert Witte, Wunstorf, all of Germany

[73] Assignee: WABCO Standard GmbH, Hanover, Germany

[21] Appl. No.: 169,577

[22] Filed: Dec. 17, 1993

[30] Foreign Application Priority Data

Dec. 19, 1992 [DE] Germany .................. 42 43 245.6

[51] Int. Cl.⁶ .................. B60T 13/00; B60T 8/00; B60T 8/26; B60T 8/60
[52] U.S. Cl. .................. 303/7; 188/3 R; 188/112 R; 280/432; 280/446.1; 303/15; 303/100
[58] Field of Search .................. 303/7-8, 303/20, 15-18, 100, 91, 102, 105, 22.1, 99, 97; 188/3 R, 3 H, 112 R, 112 A, 181 A, 195; 280/432, 446.1, 433

[56] References Cited

U.S. PATENT DOCUMENTS 5,029,947 7/1991 Knight et al. .................. 303/7
5,281,006 1/1994 Gotz et al. .................. 303/7

FOREIGN PATENT DOCUMENTS

0292687 11/1988 European Pat. Off. .
0301243 2/1989 European Pat. Off. .
0303827 2/1989 European Pat. Off. .
3428192 2/1986 Germany .
3911253 6/1990 Germany .
4003316 8/1991 Germany .
4035805 3/1992 Germany .

Primary Examiner—Douglas C. Butler
Attorney, Agent, or Firm—Meltzer, Lippe, Goldstein, et al.

[57] ABSTRACT

A process and apparatus for the braking with optimized stability of a vehicle train is disclosed. The vehicle train comprises at least two individual vehicles, one of the individual vehicles supporting the individual vehicle. The process comprises supplying energy to the brakes of the vehicles, thereby actuating the brakes and producing an actual force between the vehicles, and measuring the actual-value horizontal and vertical components ($F_{hact}$, $F_{vact}$) of the actual force ($F_{act}$) acting between the supporting and supported vehicle. A desired-value horizontal force component ($F_{hdes}$) of the force is determined by multiplying the actual-value vertical component ($F_{vact}$) by the ratio of the actual-value train deceleration (b) to the earth's acceleration (g). The desired-value horizontal force component ($F_{hdes}$) is then compared with the actual-value force horizontal component ($F_{hact}$). The energy supplied to the brakes is adjusted so that $F_{hact}$ becomes substantially equal to $F_{hdes}$ resulting in braking of the vehicle train with optimal stability.

31 Claims, 4 Drawing Sheets

METHOD AND APPARATUS FOR THE BRAKING OF A VEHICLE TRAIN

BACKGROUND OF THE INVENTION

The instant invention is a process and apparatus for the braking of a vehicle train. The vehicle train has at least two individual vehicles wherein one of the vehicles is supported by a supporting vehicle. Each of these vehicles has one or several "axle groups" which are understood to be individual axles, as well as, multiple-axle aggregates.

In such a vehicle train, the supporting individual vehicle takes over part of the weight of the supported individual vehicle when standing still and during steady-state travel, i.e., travel at constant speed. During non-steady-state travel, i.e., during acceleration and braking, it takes over part of the acceleration or braking force exerted upon the supported vehicle.

The directional stability of such a vehicle train is endangered during braking if the supported vehicle pushes too heavily because its brake or brakes produce insufficient braking force. Jackknifing of the vehicle train may occur, resulting in considerable danger to the vehicle train and to the surrounding traffic.

A process for braking a vehicle train is disclosed in DE 40 35 805 C1. This process determines the distribution of energies to the individual vehicles at a point of operation during which the force acting between the individual vehicles has assumed a desired value when the level of energy fed to the brakes is low. Based on this distribution, an attribution adapted to certain vehicle parameters at points of operation with high energy level is observed. The known process offers an approximate stability during braking of the vehicle.

SUMMARY OF THE INVENTION

The present invention improves upon known processes and apparatuses by ensuring precisely optimized stability during braking of the vehicle at all points of operation.

The present invention is a process for braking a vehicle train comprising at least two vehicles, one of which supports the other. Each vehicle has one or several axle groups having at least one brake. The supporting vehicle may have two axle groups and the supported vehicle may have one group. The brakes are actuated by the supply of energy. The process comprises the following steps during brake actuation: determining the horizontal actual-value component and the vertical actual-value component of the force acting between the vehicles, determining the actual-value vehicle train deceleration, computing a horizontal desired-value component from the vertical actual-value component and the actual-value vehicle train deceleration, and adjusting the value of the energy supplied to the brakes of one or both of the vehicles so that the horizontal actual-value component substantially equals the horizontal desired-value component.

Another embodiment of the present invention comprises determining the ratio between the horizontal actual-value component and the vertical actual-value component of the force acting between the individual vehicles, determining the ratio between the actual-value vehicle train deceleration and earth acceleration, and adjusting the value of the energy supplied to the brakes of at least one of the vehicles so that the ratios become substantially equal.

Still another embodiment of the present invention is a process comprising determining the actual-value vehicle train deceleration and adjusting the value of the energy fed to the brakes of at least one of the vehicles so that the product from the ratio and the earth acceleration becomes substantially equal to the value of the actual-value vehicle train deceleration.

An embodiment of the apparatus of the present invention includes an evaluation circuit. The inputs of the circuit are connected to a force measuring device and a said deceleration measuring device. The output of the circuit is connected to an electrical control input of a co-control system which determines or co-determines the energy supply going to the brake of a supported vehicle. The evaluation circuit comprises a means for determining a horizontal actual-value force component and a vertical actual-value force component from signals received from the force measuring device, a means for determining a horizontal desired-value component from the vertical actual-component and an actual-value vehicle train deceleration, a means for comparing said horizontal actual-value component with said horizontal desired-value component, a means for transmitting a control signal to said co-control system when an inequality occurs, and a means for adjusting the supply of energy so that said horizontal actual-value component becomes substantially equal to said horizontal desired-value component.

The invention is based on the knowledge that a vehicle train is braked with optimal directional stability, i.e., stability-optimized, when the quotient of the braking force on the road surface and of the axle load portion of the wheel concerned is equal on all braked wheels. This quotient is generally called frictional connection or adhesion utilization and represented by $\mu$.

A brake in the sense of the invention is the part of a braking system which produces braking force directly. In the case of a brake which is subjected to wear proof, this is an assembly consisting of wheel brake, braking actuator and possibly interposed transmission elements.

The present invention is suitable for any type of energy, e.g., pressure, including the pressure difference between atmospheric pressure and a negative pressure, electrical energy or mechanical force. If pressure is applied to the brake, compressed air and hydraulic pressure fluids, as well as combinations thereof, are customarily used as the energy carriers. It is also customary to use different types of energy for brake actuation and actuating control, e.g., pressure as the actuating energy and electrical energy as the control energy. The braking energy device is normally a brake cylinder.

BRIEF DESCRIPTION OF THE DRAWINGS

Additional advantages of the invention will be apparent from the explanation below through embodiments shown in the drawings, wherein.

In the figures the same reference numbers are used throughout for elements having the same functions, full lines indicate (actuation) energy circuits, broken lines indicate control circuits and dash-dot lines indicate signal circuits.

DETAILED DESCRIPTION OF PREFERRED EMBODIMENTS

Figure 1:
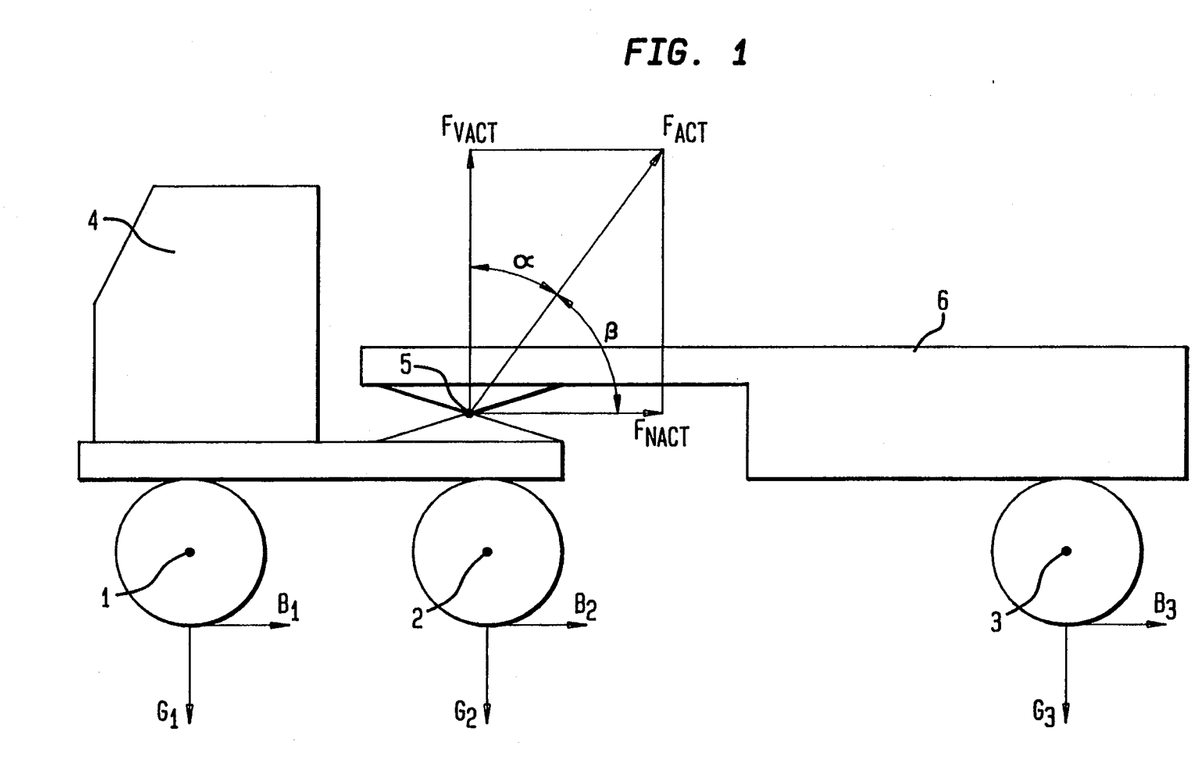
FIG. 1 shows the details of the invention through a vehicle train.

The vehicle train shown in FIG. 1 comprises a supporting individual vehicle (4) and a supported individual vehicle (6). The supporting individual vehicle (4) has two axle groups (1, 2), the supported individual vehicle (6) has one axle group (3). The axle groups are represented by a wheel. The supported vehicle (6) is connected via a schematically shown coupling (5) to the supporting vehicle (4). The individual vehicles (4, 6) may be provided in a known manner with additional axle groups. In such a case, the following explanations are applicable in an appropriate manner.

The weight of the supported individual vehicle (6) produces an axle load (G3) between the wheels of said vehicle's axle group (3) and the road and a vertical actual-value force component ($F_{vact}$) in the coupling (5). The last mentioned component is equal, but opposed, to a vertical actual-value force component ($F_{vact}$), as drawn in FIG. 1. The vertical actual-value component ($F_{vact}$) produces axle load portions between the wheels of the supporting vehicle's (4) axle groups (1,2) and the road. These load portions together with the weight of the supporting individual vehicle (4) add up to axle loads (G1 and G2) between the wheels of the axle groups (1, 2) and the road surface.

When standing and during steady-state travel of the vehicle train, the "static" or steady-state values of the vertical actual-value component ($F_{vact}$) and the axle loads (G1, G2, G3) are determined in a known manner from certain dimensions and the horizontal positions of the centers of gravity of the individual vehicles (4, 6). For the accelerated or braked vehicle train, the "dynamic" values of the loads and the vertical actual-value components are, additionally, determined in a known manner from the actual-value vehicle train acceleration or the actual-value vehicle train deceleration (hereinafter designated as "b") and the vertical center-of-gravity positions.

The individual vehicles (4) and (6) are provided with at least one brake on each axle group (1, 2, 3). In a brake actuation the braked wheels of the appertaining axle groups (1, 2, 3) transmit braking forces to the road surface. The reaction forces to the braking forces are designated as B1, B2 and B3 in FIG. 1. These are represented in the drawing out of scale.

The condition for stability-optimized braking based on the braking force and axle loads as described above is:

$$\mu = B_1/G_1 = B_2/G_2 = B_3/G_3 \quad (I)$$

The vehicle mass pertaining to each of the axle groups (1, 2, 3) is designated as m1, m2, m3. Using the mass and Earth's acceleration (g), the condition for stability-optimized braking becomes:

$$\mu = m_1 \cdot b/m_1 \cdot g = m_2 \cdot b/m_2 \cdot g = m_3 \cdot b/m_3 \cdot g = b/g \quad (II)$$

Brake actuation produces a braking force ($F_{hact}$) in the coupling which is applied to the supported individual vehicle (6). This component and the vertical actual-value force ($F_{vact}$) produce the force ($F_{act}$) as the resultant force between the individual vehicles (4) and (6). The force ($F_{act}$) takes effect at an angle ($\alpha$) to the vertical and at an angle ($\beta$) to the horizontal. The force ($F_{act}$) and its actual-value components are shown in their direction of action on the supported individual vehicle (6) in FIG. 1. To obtain the same result, the use of the force ($F_{act}$) and its actual-value components can also be based on their produced reaction forces upon the supporting individual vehicle (4).

The preceding explanations and the drawn representations assume that the supporting individual vehicle (4) precedes the supported individual vehicle (6). A person schooled in the art will recognize that this explanation and the drawn representations would also apply, in identical application or with appropriate changes, if the supporting individual vehicle (4) follows the supported individual vehicle (6). This is often the case in rail traffic and in maneuvering operations of road vehicle trains.

Typical examples of vehicle trains used with this invention are articulated road trains, drawbar trains with supported rigid drawbar and articulated buses. The supporting vehicle is normally either a towing vehicle (tractor) in a double train (semi-trailer train) or a motor vehicle with its own payload, e.g., passengers in a drawbar train or an articulated bus. The supported vehicle is normally the double train trailer in a double train, a single-axle trailer or a multi-axle trailer with a brake behavior like a single-axle trailer, in a drawbar train, and a propped-up trailer in an articulated bus. However, vehicle trains with more than two individual vehicles are known, in which the supporting as well as the supported individual vehicle belong to the "trailer" category. Furthermore, in a drawbar train and in an articulated bus the coupling is normally placed behind the last axle group of the supporting individual vehicle, at variance with what is shown.

Figure 2:
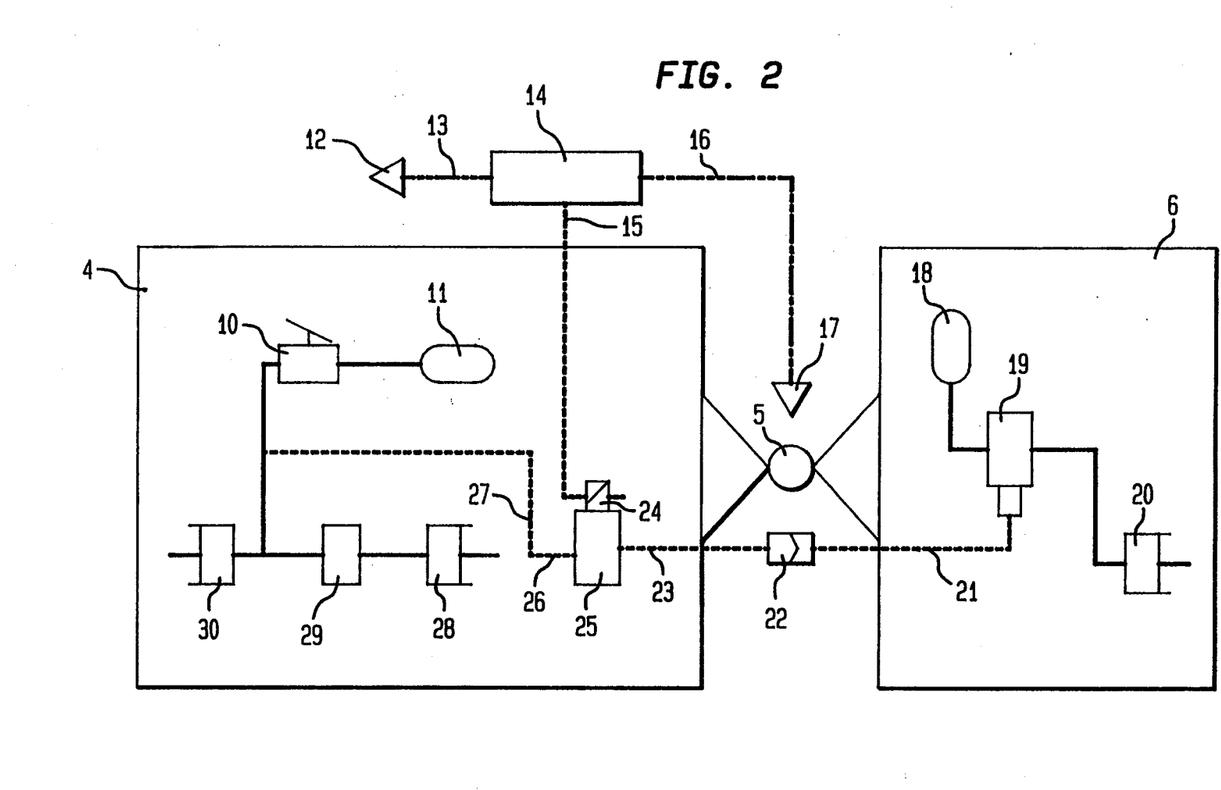
FIG. 2 schematically shows the components of the vehicle train according to FIG. 1 to ensure stability-optimized braking.
Figure 3:
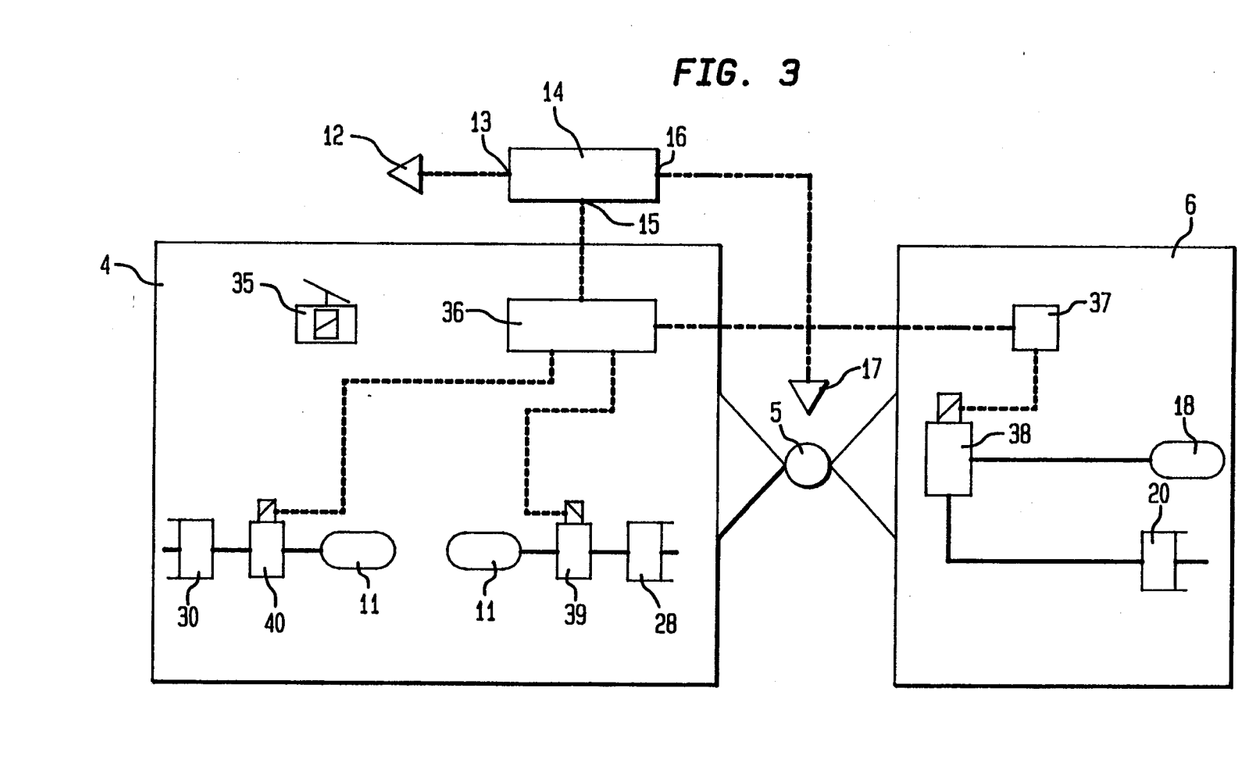
FIG. 3 schematically shows the vehicle train according to FIG. 1 with different components from FIG. 2.

The following discussion of FIGS. 2 and 3 assumes that the vehicle train is an articulated train with a towing vehicle as the supporting vehicle (4) and an articulated trailer as the supported vehicle (6). The following descriptions apply correspondingly to vehicle trains put together in a different manner.

According to FIG. 2, the towing or supporting vehicle is equipped with a towing vehicle brake (28, 30) at each axle group and the articulated trailer or supported vehicle is equipped with a trailer brake (20) at its axle group. These brakes are actuated by the supply of energy. Therefor, they are represented symbolically by their actuators. Each brake can be only one of the related axle groups, but can also symbolize a plurality of brakes. To achieve uniform frictional connection utilization at the braked wheels of the towing vehicle, a conventional automatic brake force modulator (29) is provided.

The towing vehicle brakes (28, 30) are part of a towing vehicle braking system (10, 11, 28, 30). The system includes a towing vehicle energy reserve (11), a braking value demand mechanism (10) and related energy circuits. The braking value demand mechanism (10) is connected to the towing vehicle energy reserve (11) and to the towing vehicle brakes (28, 30) and the braking force modulator (29), respectively.

The towing vehicle further comprises a trailer energy adjuster (25) with two control inputs (24, 26). The first control input (26) is connected via a control circuit (27) to the braking value demand mechanism (10) and is parallel to the towing vehicle brakes (28, 30).

The trailer brake (20) is a component of a trailer braking system (18, 19, 20, 25) which comprises the trailer energy adjuster (25) located in the towing vehicle, a trailer energy reserve (18), a trailer control device (19). The last mentioned components are located in the articulated trailer. The control input of the trailer control device (19) is connected via a trailer control circuit (21, 22, 23), located partly in the towing vehicle and partly in the articulated trailer and containing a control coupling (22) connected to the output of the trailer energy adjuster (25). The trailer control device (19) and the trailer energy adjuster (25) with the related control circuits (21, 22, 23, 27) constitute a co-control device (19, 25) for the trailer brake (20).

Both the towing vehicle braking system (10, 11, 28, 30) and the trailer braking system (18, 19, 20, 25) may be a service braking system, an auxiliary braking system or a (wear-proof) continuous braking system as is known and required in many countries by law. The towing vehicle braking system and/or the trailer braking system may be subdivided in a conventional manner, not shown, into at least two braking circuits with separate energy reserves and multi-circuit braking value demand mechanism and trailer energy adjuster or multi-circuit trailer control device.

To supply the energy reserves (11 and 18) and the trailer energy adjuster (25) with energy, the towing vehicle contains an energy supply installation, not shown, designed in a known manner, including a distribution device, safety devices and energy circuits. The components of the braking system and their interaction described up to this point are conventional.

If pressure is used as energy and one or several pressure fluids are used as energy carriers, the energy reserves (11 and 18) are designed in the form of pressure reserves (reservoirs), the braking value demand mechanism (10) is designed in the form of a foot or hand operated valve, the trailer energy adjuster (25) is designed in the form of a trailer control valve and the trailer control device (19) is designed in the form of a trailer braking valve.

For brake actuation, the driver of the vehicle train introduces an energy demand signal in the form of an actuating force and/or an actuating travel into the braking value demand mechanism (10). The braking demand mechanism (10) thereupon allows energy to pass from the towing vehicle energy reserve (11) to the towing vehicle brakes (28, 30) and to the first control input (26) of the trailer energy adjuster (25). The energy value being determined by the value of the energy demand signal. The energy at the first control input (26) causes the trailer energy adjuster (25) to transmit a corresponding trailer energy signal via the trailer control circuit (21, 22, 23) to the trailer control device (19). The control device (19) causes energy of a value corresponding to the value of the trailer energy signal to pass through from the trailer energy reserve (18) to the trailer brake (20).

Before the energy from the braking value demand mechanism (10) or the trailer control device (19) can be fed to the respective brakes (28 or 20), it is influenced in a known manner by additional devices. One such device for one towing vehicle brake (30) is the braking force modulator (29), other such devices are, for example, or the valves of an anti-lock brake system ("ABS"). As a result of the energy being supplied, the towing vehicle brakes (28, 30) and the trailer brake (20) each produce brake forces corresponding to the value of the respectively fed energy. The braking force modulator (29) adjusts the energy so that the same frictional connection utilization, $\mu = B_1/G_1 = B_2/G_2$, results at the braked wheels of both towing vehicle's axle groups (1 and 2).

The driver thus controls the application of the brakes (28, 30 and 20) by means of the braking value demand mechanism (10) or, respectively, participates in the control of the energy supplied to them.

A coupling force regulation is superimposed on the driver's control of the energy fed to the trailer brake (20) or, respectively, the driver's participation therein. This is achieved by means of a force measuring sensor (17), a deceleration measuring sensor (12), and the evaluation circuit (14) connected to the second control input (24) of the trailer energy adjuster (25) which assumes the function of an electrical control input of the co-control system (19, 15).

The force measuring sensor (17) has an output connected to a first input (16) of the evaluation circuit (14) and is located at a suitable point in the vicinity of the coupling (5) and/or its attachment. The force measuring sensor (17) is designed to measure the vertical and horizontal actual-value components ($F_{vact}$, $F_{hact}$) of the force ($F_{act}$) acting between the individual vehicles directly. It can also measure the components of the force ($F_{act}$) in other directions, i.e., in the directions inclined to the vertical and/or horizontal. From these measurements the evaluation circuit (14) or an additional computing component, not shown, computes the actual-value components. Such force measuring sensors are known in the form of complete components and can also be designed from individual force sensors in a suitable angle arrangement.

The output of the conventional deceleration measuring sensor (12) is connected to a second input (13) of the evaluation circuit (14). It measures the actual-value vehicle train deceleration (b) and is installed at a suitable location in one or both of the individual vehicles. The measuring sensors may be adapted from anti-lock brake technology. If one or both individual vehicles are equipped with an anti-lock brake system, the anti-lock brake system delivers signals representing the actual-value vehicle train deceleration (b) by means of one or more wheel speed sensors at no additional cost.

The evaluation circuit (14) has an output (15) connected to the second control input (24) of the trailer energy adjuster (25). It processes the signals of the force measuring sensor (17) and the deceleration measuring sensor (12), as described below. This circuit contains generally known control elements, such as a microprocessor, and the programs that are required for the present invention.

One embodiment of the evaluation circuit (14) computes a horizontal desired-value force component ($F_{hdes}$) from the vertical actual-value component ($F_{vact}$) and the actual-value vehicle train deceleration (b) according to the formula:

$$(F_{hdes}) = (F_{vact}) \cdot b/g \tag{III}$$

The evaluation circuit (14) then compares the horizontal actual-value component ($F_{hact}$) to the horizontal desired-value component ($F_{hdes}$). If, and for as long as, it detects an inequality or difference, the circuit (14) transmits a control signal to the second control input (24) of the trailer energy adjuster (25). The control signal transmitted by the control circuit (21, 22, 23) to the trailer control device (19) is modified by the trailer energy adjuster (25) until the braking force produced at the trailer brake is modified, to such an extent that the difference between the actual horizontal force ($F_{hact}$) and the desired horizontal force ($F_{hdes}$) disappears. The concept "disappearance of the difference" is to be understood within feasible and customary tolerances.

The coupling force regulation thus implemented, achieves the same frictional connection utilization $\mu$ for the braked wheels of the axle group (30) of the articulated trailer (16) and the braked wheels of the axle groups (1, 2) of the towing vehicle (4). This results from the following analysis.

The mass of the articulated or supported trailer (6) is designated $m_A$ and the coupling's (5) share of that mass is designated $m_K$. When the difference disappears, i.e., when $F_{hact} = F_{des}$, $m_K$ is decelerated equally with the actual-value vehicle train deceleration (b). This deceleration occurs when the braking force $B_3$ on axle group (3) of the articulated trailer also decelerates the associated mass share ($m_A - m_K$) equally with the actual-value vehicle train deceleration.

Thus:

$$B_3 = (m_A - m_K) \cdot b \qquad (IV)$$

The related axle load is:

$$G_3 = (m_A - m_K) \cdot g \qquad (V)$$

After cancelling out ($m_A - m_K$), (IV) and (V) result in:

$$B_3/G_3 = b/g.$$

According to equation (II) above, this ratio is also the frictional connection utilization, $\mu = B_1/G_1 = B_2/G_2$, applied at the wheels of the axle groups (1) and (2).

The function of the coupling force regulation can be improved if the influences exerted by a continuous-braking system and the road slope (driving uphill or downhill) upon the braking force distribution in the vehicle train are taken into consideration. This would prevent possible overheating of the trailer brake (20). For this purpose, the horizontal force component which may be left from the previous steady-state travel is measured, stored and subtracted as a residual deflection value during coupling force regulation from the momentary $F_{hact}$. The residual value of the force measuring sensor (17) in the horizontal direction is thereby also adjusted.

In the previously mentioned embodiment in which the force measuring sensor (17) measures components of the force ($F_{act}$) in other directions than vertically and/or horizontally, the evaluation circuit (14) carries out the computation of the vertical and horizontal actual-value components ($F_{vact}$) and ($F_{hact}$) from the signals of the force measuring device (17).

In another embodiment, the evaluation circuit (14) computes the ratio ($F_{hact}/F_{vact}$) between the horizontal actual-value component ($F_{hact}$) and the vertical actual-value component ($F_{vact}$) and the ratio between the actual-value vehicle train deceleration (b) and the earth's acceleration (g). It then compares these ratios and for as long as it detects an inequality between the ratios, it emits the control signal which controls the braking force production, as described above. The results and consequences of the braking force are the same as described above.

In yet another embodiment, the evaluation circuit (14) calculates the product ($F_{hact} \times g/F_{vact}$) of the ratio ($F_{hact}/F_{vact}$) between the horizontal actual-value component ($F_{hact}$) and the vertical actual-value component ($F_{vact}$) with the earth's acceleration (g). This product is compared with the actual-value vehicle train deceleration (b) and a control signal is issued if an inequality is detected. The results and consequences on the braking force are the same as described above.

In a manner not shown here the disappearance of the above-mentioned inequalities can also be achieved through additional or exclusive intervention in the adjustment of the supplied braking energy in the towing vehicle.

Where the evaluation circuit (14) uses the ratio ($F_{hact}/F_{vact}$) of the actual-value components ($F_{vact}$, $F_{hact}$), the force measuring sensor (17) can be made in the form of an angle measuring sensor. Such a sensor measures an angle ($\alpha$ or $\beta$) of attack of the force ($F_{act}$), $\alpha$ in relation to the vertical and $\beta$ in relation to the horizontal. The tangent of $\alpha$ or cotangent of $\beta$ reflect the ratio ($F_{hact}/F_{vact}$) of the actual-value components. Angle measuring sensors which can be used as force measuring sensors are known. In this case, a computing phase, in the evaluation circuit (14) or in the form of an autonomous intermediate phase, determines the angle functions from the signals of the angle measuring sensor (17).

Taking into consideration the influences of a possibly present continuous-braking system and the road slope (up-hill or down-hill travel) upon the braking force distribution in the vehicle train can improve the functions of coupling force regulation and can prevent possible overheating of the trailer brake (20). For this purpose, the ratio ($F_{hact}/F_{vact}$) which may be left over from the previous steady-state travel is measured, stored and subtracted as a residual deflection value from the momentary relationship ($F_{hact}/F_{vact}$) during coupling force regulation. The residual value of the force measuring sensor (17) which is an angle measuring sensor is, thereby, also adjusted.

A possibly existing residual deflection of the characteristic line of the force measuring sensor (17) can be adjusted by measuring and storing the force signal during operation of the towing vehicle without the trailer and by subtracting the stored value during subsequent operation with the trailer during brake actuation. This is accomplished by means of an adjusting control in the form of an offset error magnitude from the momentary signal of the force measuring sensor (17).

A signal interference amplitude of the signal of the force measuring sensor (17) may be present. It can be used as a criterion to recognize operation of the towing vehicle without the trailer. Due to frame and spring deflection oscillations of the moving vehicle train the signal contains interfering signals. Using the interfering signals in combination with information concerning the attainment of a predetermined travel speed, it is possible to distinguish between operation with and without the trailer.

Another embodiment of the evaluation circuit (14) stores the ratio between the energies fed to one or both towing vehicle brakes (28, 30) and to the trailer brake (20) during one or several brake actuations. At the beginning of one or several subsequent brake actuations, the control signal transmitted to the second control device (24) of the trailer energy adjuster (25) is adjusted so that the values of the energies fed to the brakes (20, 28, 30) of the individual vehicles will assume the stored ratio. In this embodiment the energy is fed to the trailer brake (20) either at the beginning of one or several subsequent brake actuations with a basic setting or presetting learned from previous brake actuations. Therefore, it is unnecessary for the coupling force regulation to reset the frictional connection utilization μ on the wheels of the trailer axle for each brake actuation.

The deceleration measuring sensor (12), the evaluation circuit (14) and the force measuring sensor (17) are shown in FIG. 2 outside the individual vehicles. The intention is to show that each of these sensors can be installed in the towing vehicle, articulated trailer, or be distributed between the two. It is also possible for the trailer control device (19) to be provided with a second, electrical control device in a manner not shown here. In that case the second control input of the trailer control device (19) would constitute the electrical control input of the co-control device (19, 25), so that the second control input (24) of the trailer energy adjuster (25) could be dispensed with, at least for the regulation of coupling force.

In another embodiment, shown in FIG. 3, different types of energy are used for brake actuation and control in the towing vehicle braking system (11, 28, 30, 35, 36, 39, 40) and in the trailer braking system (18, 20, 37, 38). Electrical energy can be used for the control system and any desired energy as the actuation energy. The components of these braking systems are known or can be produced through simple adaptation of known components. Such mixed systems where pressure is the actuating energy are in general use in road vehicles and road vehicle trains.

Each towing vehicle brake (28, 30) is assigned its own energy reserve (11). The towing vehicle braking system (11, 28, 30, 35, 36, 39, 40) comprises an electrical braking value demand mechanism (35), towing vehicle electronics (36) and an energy distributor (39 and 40) for each towing vehicle brake (28 and 30). The towing vehicle braking system (11, 28, 30, 35, 36, 39, 40) is shown as having two circuits.

The trailer braking system (18, 20, 37, 38) comprises trailer energy reserve (18), trailer brake (20), trailer electronics (37) and an energy distributor (38). One input of the trailer electronics (37) is connected to an output of the towing vehicle electronics (36). The energy distributors (38, 39, 40) may be the only energy distributors of the towing vehicle or of the articulated trailer. However, if several brakes are provided per axle group, each brake may be equipped with its own energy distributor. An energy distributor in a road vehicle or in a road vehicle train using pressure as the actuating energy is often called an "electrically actuated pressure modulator".

The output of the braking value demand system (35) is connected to an input of the towing vehicle electronics (36). The output (15) of the evaluation circuit (14) for transmitting the control signal for coupling force regulation is also connected to an input of the towing vehicle electronics (36). The device for coupling force regulation acts as described above for the previous embodiment.

Each of the energy distributors (38, 39, 40) has an energy element by which it is connected on the one side to the associated energy reserve (11 or 18) and on the other side to the associated brake (28 or 30 or 20). Each of the energy distributors (38, 39, 40) also has an electrical control element the input of which is connected to an output of the corresponding electronics (36 or 37).

In a brake actuation the braking value demand mechanism (35) converts the energy demand signal initiated by the driver of the vehicle train into an electrical energy demand signal which is transmitted to the input of the towing vehicle electronics (36). The energy demand signal is then edited into control signals for the energy distributors (39, 40) of the towing vehicle and the trailer electronics (37).

The trailer electronics (37) edits the control signal received from the towing vehicle electronics (36) into a control signal for the associated energy distributor (38). In editing the control signals which it transmits to the energy distributors (38 or 39 or 40), the towing vehicle electronics (36) and the trailer electronics (37) are able to process specific vehicle parameters supplied in signal form. One or several wheel or axle loads could be such vehicle parameters. In that case the towing vehicle electronics (36) and/or the trailer electronics (37) adapts the control signal of at least one energy distributor (38 or 39 or 40) to the load distribution.

The towing vehicle electronics (36) establishes the load-dependent braking force regulation and, thereby, the uniform frictional connection utilization μ at the braked wheels of the axle groups (1, 2) of the towing vehicle.

Upon receiving respective control signal, each energy distributor (38 or 39 or 40) allows energy to pass from the associated energy supply (11 or 18) to the associated brake (28 or 30 or 20). The value of said energy is determined by the value of the control signal. The brakes then produce corresponding braking forces. The braking forces are distributed among the braked wheels of the axle groups (1, 2, 3) by the signal processing in either the towing vehicle electronics (36) or the trailer electronics (37) for the purpose of uniform frictional connection utilization and, hence, optimal directional stability.

In the present embodiment, the control signal emitted by the evaluation circuit (14) can alternatively be fed to and be utilized by the trailer electronics (37), not shown. The co-control device is integrated into the electronics (36, 37) in this embodiment, and specifically into the trailer electronics (37).

Figure 4:
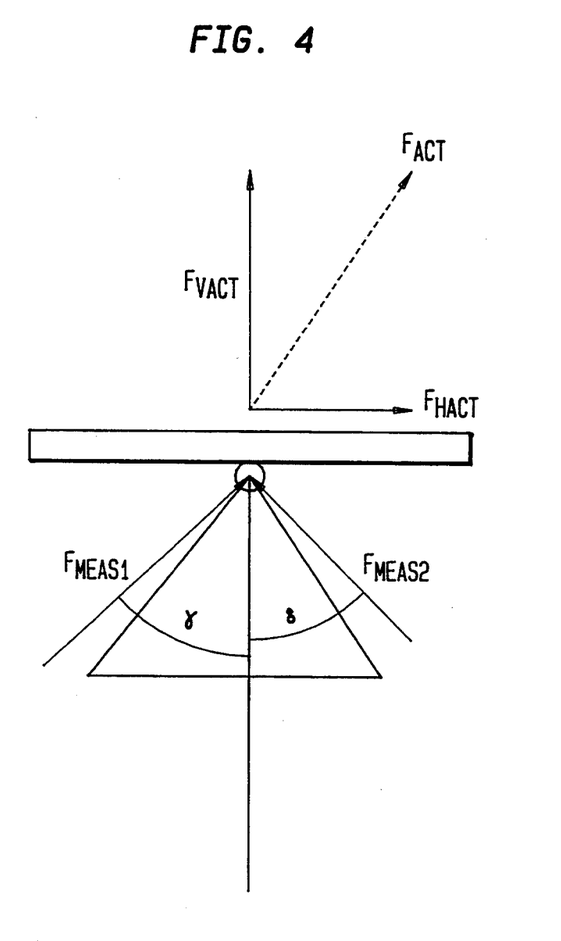
FIG. 4 schematically shows the features of a force measuring device taken as an example.

FIG. 4 schematically shows a force measuring sensor (17) which measures components ($F_{Meas1}$ and $F_{Meas2}$) of the force ($F_{act}$) in directions forming an angle with the vertical and/or the horizontal direction. The directions are defined by the angles ($\gamma$ or $\delta$) formed with the vertical. It can be shown that the following equations apply:

$$F_{hact} = F_{Meas1} \cdot \sin\gamma - F_{Meas2} \cdot \sin\delta \qquad \text{(VI)}$$

$$F_{vact} = F_{Meas1} \cdot \cos\gamma - F_{Meas2} \cdot \cos\delta \qquad \text{(VII)}$$

The ratio ($F_{act}/F_{vact}$) of the actual-value components is the quotient from the equations (VI) and (VII).

Such a force measuring sensor as shown in FIG. 4 is advantageous especially when the measuring precision of the sensors is reduced. This precision is usually reduced in the lower zone of their operating ranges. In this situation, the general force measuring sensor (17) delivers imprecise results in direct measurement of the horizontal actual-value component ($F_{hact}$) for small values which may affect the quality of the coupling force regulation.

In the force measuring sensor shown in FIG. 4, on the other hand, all the sensors are constantly precharged so heavily by the vertical actual-value component ($F_{act}$) that they constantly operate in a zone of operation with satisfactory measuring precision. By "constantly" it is meant even with minimal horizontal force component and even without any horizontal force component. It has been shown to be especially advantageous if the angles ($\gamma$ and $\delta$) are each selected to be 45°.

In all other respects the explanations given for one embodiments apply directly or correspondingly also to the other embodiment insofar as nothing else is indicated above. The person schooled in the art will recognize that the area of protection of the invention is not limited to the embodiments given as examples but cover all designs whose characteristics are covered by the claims.

We claim:

1. A process for braking a vehicle train which comprises at least one supporting vehicle having at least one axle group and at least one supported vehicle having at least one axle group and supported by said supporting vehicle, each of said axle groups having at least one brake, the process comprising,
   a) actuating said brakes by supplying them with energy;
   b) determining a horizontal actual-value component ($F_{hact}$) and a vertical actual-value component ($F_{vact}$) of a force ($F_{act}$) acting between said vehicles;
   c) determining an actual-value vehicle train deceleration (b);
   d) determining a horizontal desired-value component ($F_{hdes}$) from said vertical actual-value component ($F_{vact}$) and said actual-value vehicle train deceleration (b); and
   e) adjusting the energy supplied to said brakes of at least one of said vehicles so that the horizontal actual-value component ($F_{hact}$) becomes substantially equal to said horizontal desired-value component ($F_{hdes}$).

2. The process of claim 1, further comprising determining said horizontal actual-value component ($F_{hact}$) and said vertical actual-value component ($F_{vact}$) by making force measurements in directions inclined toward the vertical, the horizontal or both.

3. The process of claim 1 further comprising employing
   a) a braking value demand mechanism for at least co-determining said energy fed to at least one brake of said supporting vehicle,
   b) a co-control system having at least one electrical control input for at least co-determining said energy fed to the at least one brake of said supported vehicle,
   c) a coupling connecting said supported vehicle to said supporting vehicle for transmitting a force ($F_{act}$) acting between said vehicles,
   d) a force measuring sensor for measuring components of said force ($F_{act}$),
   e) a deceleration measuring sensor for measuring said actual-value vehicle train deceleration (b), and
   f) an evaluation circuit having a first input connected to said force measuring sensor and a second input connected to said deceleration measuring sensor and at least one output connected to said electrical control input of said co-control system, a means for determining said horizontal actual-value component ($F_{hact}$) and said vertical actual-value component ($F_{vact}$) of said force ($F_{act}$) from signals from said force measuring sensor, a means for determining said horizontal desired-value component ($F_{hdes}$) from the vertical actual-component ($F_{vact}$) and said actual-value vehicle train deceleration (b), means for comparing said horizontal actual-value component ($F_{hact}$) with said horizontal desired-value component ($F_{hdes}$), a means for transmitting a control signal to said co-control system when an inequality is found between said horizontal components.

4. The process of claim 3, further comprising employing a means for storing a ratio between energy supplied to said at least one brake of the supporting vehicle and energy supplied to the at least one brake of said supported vehicle during at least one brake actuation and a means for adapting said control signal at the beginning of at least one subsequent brake actuation so that the energies supplied to said brakes substantially equal said stored ratio.

5. The process of claim 1 further comprising employing
   a) a braking value demand mechanism for at least co-determining said energy fed to at least one brake of said supporting vehicle,
   b) a co-control system having at least one electrical control input for at least co-determining said energy fed to the at least one brake of said supported vehicle,
   c) a coupling connecting said supported vehicle to said supporting vehicle for transmitting a force ($F_{act}$) acting between said vehicles,
   d) a force measuring sensor for measuring said horizontal actual-value component ($F_{hact}$) and said vertical actual-value component ($F_{vact}$) of said force ($F_{act}$),
   e) a deceleration measuring sensor for measuring said actual-value vehicle train deceleration (b), and
   f) an evaluation circuit having a first input connected to said force measuring sensor and a second input connected to said deceleration measuring sensor and at least one output connected to said electrical control input of said co-control system, a means for determining said horizontal desired-value component ($F_{hdes}$) from the vertical actual-component ($F_{vact}$) and said actual-value vehicle train deceleration (b), means for comparing said horizontal actual-value component ($F_{hact}$) with said horizontal desired-value component ($F_{hdes}$), a means for transmitting a control signal to said co-control system when an inequality is found between said horizontal components.

6. The process of claim 5, further comprising employing a means for storing a ratio between energy supplied to said at least one brake of the supporting vehicle and energy supplied to the at least one brake of said supported vehicle during at least one brake actuation and a means for adapting said control signal at the beginning of at least one subsequent brake actuation so that the energies supplied to said brakes substantially equal said stored ratio.

7. The process of claim 1, further comprising supplying said energy to said brakes of said supported vehicle at the beginning of brake actuation using a basic setting learned during preceding brake actuations.

8. The process of claim 1, further comprising obtaining said horizontal actual-value component ($F_{hact}$) by measuring and storing a residual deflection value and subtracting said residual deflection value from a momentary horizontal actual-value component.

9. The process of claim 8, wherein said residual deflection value is a horizontal component of the force which is present at the beginning of brake actuation and left over from previous steady-state travel of the vehicle train.

10. The process of claim 1, wherein said horizontal desired value component is determined according to $$F_{hdes} = F_{vact} \times b/g.$$

11. A process for braking a vehicle train which comprises at least one supporting vehicle having at least one axle group and at least one supported vehicle having at least one axle group and supported by said supporting vehicle, each of said axle groups having at least one brake, the process comprising,
   a) actuating said brakes by supplying them with energy;
   b) determining a horizontal actual-value component ($F_{hact}$) and a vertical actual-value component ($F_{vact}$) of a force ($F_{act}$) acting between said vehicles;
   c) determining an actual-value vehicle train deceleration (b);
   d) determining a ratio ($F_{hact}/F_{vact}$) between said horizontal actual-value component ($F_{hact}$) and said vertical actual-value component ($F_{vact}$); and
   e) adjusting the energy supplied to said brakes of at least one of said vehicles until a parameter which depends on said ratio ($F_{hact}/F_{vact}$) is substantially equal to a parameter which depends on said actual-value train deceleration (b).

12. The process according to claim 11, wherein said parameter dependent on said ratio ($F_{hact}/F_{vact}$) is said ratio ($F_{hact}/F_{vact}$) and said parameter which depends on said actual-value train deceleration is a ratio (b/g) between said actual value train deceleration (b) and earth's acceleration (g).

13. The process according to claim 11, wherein said parameter dependent on said ratio ($F_{hact}/F_{vact}$) is a product ($F_{hact}/F_{vact} \times g$) of said force component ratio ($F_{hact}/F_{vact}$) and earth's acceleration (g) and said parameter which depends on said actual-value train deceleration (b) is said actual value train deceleration (b).

14. The process of claim 11, further comprising determining said ratio ($F_{hact}/F_{vact}$) of the actual-value components of said force by making force measurements.

15. The process of claim 14, further comprising making said force measurements in directions inclined toward the horizontal, the vertical or both.

16. The process of claim 11, further comprising determining said ratio ($F_{hact}/F_{vact}$) of the actual-value force components of said force ($F_{act}$) by measuring an angle of attack of said force ($F_{act}$).

17. The process of claim 11, further comprising determining said ratio ($F_{hact}/F_{vact}$) of the actual-value components of said force by, first, measuring an angle of attack ($\alpha$) of said force to the vertical and, then, determining a tangent of said angle of attack ($\alpha$).

18. The process of claim 11, further comprising determining said ratio ($F_{hact}/F_{vact}$) of the actual-value components of said force by, first, measuring an angle of attack ($\beta$) of said force to the horizontal and, then, determining a cotangent of said angle of attack ($\beta$).

19. The process of claim 11, further comprising obtaining said ratio ($F_{hact}/F_{vact}$) of said actual-value components by measuring and storing a residual deflection value and subtracting said residual deflection value from a momentary horizontal and vertical force components ratio.

20. The process of claim 19, wherein said residual deflection value is a ratio between horizontal and vertical force components present at the beginning of brake actuation and left over from previous steady-state travel.

21. The process of claim 11 further comprising employing
   a) a braking value demand mechanism for at least co-determining said energy fed to at least one brake of said supporting vehicle,
   b) a co-control system having at least one electrical control input for at least co-determining said energy fed to the at least one brake of said supported vehicle,
   c) a coupling connecting said supported vehicle to said supporting vehicle for transmitting a force ($F_{act}$) acting between said vehicles,
   d) a force measuring sensor for measuring components of said force ($F_{act}$),
   e) a deceleration measuring sensor for measuring said actual-value vehicle train deceleration (b), and
   f) an evaluation circuit having a first input connected to said force measuring sensor and a second input connected to said deceleration measuring sensor and at least one output connected to said electrical control input of said co-control system, a means for determining a horizontal actual-value component ($F_{hact}$) and a vertical actual-value component ($F_{vact}$) of said force ($F_{act}$) from signals from said force measuring sensor, a means for determining a ratio ($F_{hact}/F_{vact}$) between the horizontal actual-value component ($F_{hact}$) and the vertical actual-value component ($F_{vact}$), a means for comparing a parameter which depends on said force components ratio ($F_{hact}/F_{vact}$) and a parameter which depends on said actual-value train deceleration (b), a means for transmitting a control signal to the co-control system if an inequality exists between said parameters.

22. The process of claim 21, wherein said parameter which depends on said ratio ($F_{hact}/F_{vact}$) is said ratio ($F_{hact}/F_{vact}$) and said parameter which depends on said actual-value vehicle train deceleration (b) is a ratio (b/g) between said actual-value train deceleration and earth's acceleration (g).

23. The process of claim 21 wherein said parameter dependent on said ratio ($F_{hact}/F_{vact}$) is a product ($F_{hact}/F_{vact} \times g$) of said force component ratio ($F_{hact}/F_{vact}$) and earth's acceleration (g) and said parameter which depends on said actual-value train deceleration (b) is said actual-value train deceleration (b).

24. The process of claim 21, further comprising employing a means for storing a ratio between energy supplied to said at least one brake of the supporting vehicle and energy supplied to the at least one brake of said supported vehicle during at least one brake actuation and a means for adapting said control signal at the beginning of at least one subsequent brake actuation so that the energies supplied to said brakes substantially equal said stored ratio.

25. The process of claim 21, wherein said force measuring sensor is an angle measuring sensor for measuring a vertical ($\alpha$) or horizontal ($\beta$) angle of attack of said force ($F_{act}$) and further comprising a means for determining a tangent of said vertical angle of attack ($\alpha$)

and/or a cotangent of said horizontal angle of attack ($\beta$).

26. The process of claim 11 further comprising employing
   a) a braking value demand mechanism for at least co-determining said energy fed to at least one brake of said supporting vehicle,
   b) a co-control system having at least one electrical control input for at least co-determining said energy fed to the at least one brake of said supported vehicle,
   c) a coupling connecting said supported vehicle to said supporting vehicle for transmitting a force ($F_{act}$) acting between said vehicles,
   d) a force measuring sensor for measuring components of said horizontal actual-value component ($F_{hact}$) and said vertical actual-value component ($F_{vact}$) of said force ($F_{act}$),
   e) a deceleration measuring sensor for measuring said actual-value vehicle train deceleration (b), and
   f) an evaluation circuit having a first input connected to said force measuring sensor and a second input connected to said deceleration measuring sensor and at least one output connected to said electrical control input of said co-control system, a means for determining said ratio ($F_{hact}/F_{vact}$) between the horizontal actual-value component ($F_{hact}$) and said vertical actual-value component ($F_{vact}$), a means for comparing a parameter which depends on said force components ratio ($F_{hact}/F_{vact}$) and a parameter which depends on said actual-value train deceleration (b), a means for transmitting a control signal to the co-control system if an inequality exists between said parameters.

27. The process of claim 26, wherein said parameter which depends on said ratio ($F_{hact}/F_{vact}$) is said ratio ($F_{hact}/F_{vact}$) and said parameter which depends on said actual-value vehicle train deceleration (b) is a ratio (b/g) between said actual-value train deceleration and earth's acceleration (g).

28. The process of claim 26 wherein said parameter dependent on said ratio ($F_{hact}/F_{vact}$) is a product ($F_{hact}/F_{vact} \times g$) of said force component ratio ($F_{hact}/F_{vact}$) and earth's acceleration (g) and said parameter which depends on said actual-value train deceleration (b) is said actual-value train deceleration (b).

29. The process of claim 26, further comprising employing a means for storing a ratio between energy supplied to said at least one brake of the supporting vehicle and energy supplied to the at least one brake of said supported vehicle during at least one brake actuation and a means for adapting said control signal at the beginning of at least one subsequent brake actuation so that the energies supplied to said brakes substantially equal said stored ratio.

30. The process of claim 26, wherein said force measuring sensor is an angle measuring sensor for measuring a vertical ($\alpha$) or horizontal ($\beta$) angle of attack of said force ($F_{act}$) and further comprising a means for determining a tangent of said vertical angle of attack ($\alpha$) and/or a cotangent of said horizontal angle of attack ($\beta$).

31. The process of claim 11, further comprising supplying said energy to said brakes of said supported vehicle at the beginning of brake actuation using a basic setting learned during preceding brake actuations.

* * * * *